Dec. 28, 1948. W. K. LEICY 2,457,693
MOWER ATTACHMENT FOR TRACTORS
Filed Jan. 24, 1945 3 Sheets-Sheet 1

INVENTOR.
W. K. Leicy
BY

Dec. 28, 1948.   W. K. LEICY   2,457,693
MOWER ATTACHMENT FOR TRACTORS
Filed Jan. 24, 1945   3 Sheets-Sheet 2

INVENTOR.
W. K. Leicy
BY Robert Robb
Attorneys

Patented Dec. 28, 1948

2,457,693

UNITED STATES PATENT OFFICE 2,457,693

MOWER ATTACHMENT FOR TRACTORS

Walter K. Leicy, Crestline, Ohio, assignor to The Burch Corporation, Crestline, Ohio, a corporation Application January 24, 1945, Serial No. 574,228

6 Claims. (Cl. 56—25)

1

My present invention embodies certain novel improvements in the construction of power operated mower attachments for tractors of the type in which a cutter bar unit is adapted to be mounted upon the frame of the tractor vehicle, and suitable instrumentalities are provided for elevating said unit to different operating positions in relation to the ground surface during travel of the tractor vehicle, and in which other suitable instrumentalities are availed of for varying the operating angle of the cutter bar mechanism to conform with the surface over which it operates, whether said angle is one in which the cutter bar is disposed horizontally for travel over an even surface, or inclined either downwardly or upwardly to correspond with various inclined surfaces with respect to which the mowing operation is intended to be employed.

A primary object of my invention has been to provide a mower attachment of the class referred to in which the main supporting shoe for the cutter bar carries a fluid operated motor controlled from the operator's seat on the tractor vehicle for driving the cutting blade or knife.

A further object of the invention has been to provide novel pivoting or supporting means intermediate a side of the frame of a vehicle and the general attachment structure, whereby the attachment unit may be adjusted for working the cutter blade at various angles in relation to the surface over which it travels in the mowing operation. Said means includes a turntable unit and a trunnion member forming a part of the attachment and detachably secured in an appropriate position on the chassis or frame of the tractor vehicle.

A further object of the invention has been to provide special adjusting means for the mower attachment for effecting the shifting of the operating position of the cutter bar and its associated parts to various angles respecting the surface traveled over, as last referred to, said adjusting means conveniently located adjacent the seat for the operator of the vehicle.

My present improvements also contemplate the employment of pressure operated devices, cylinder, and piston units, for effecting the bodily raising and lowering of the cutter bar mechanism and for rocking the said mechanism upon the hinge bracket supporting the same from the tractor frame to carry the cutter bar into a substantially vertical position when desired to put the same out of use.

For a full understanding of my invention and other details of improvement more specifically referred to in the foregoing outline, I refer to the following detail description and accompanying drawings, in which.

Figure 3:
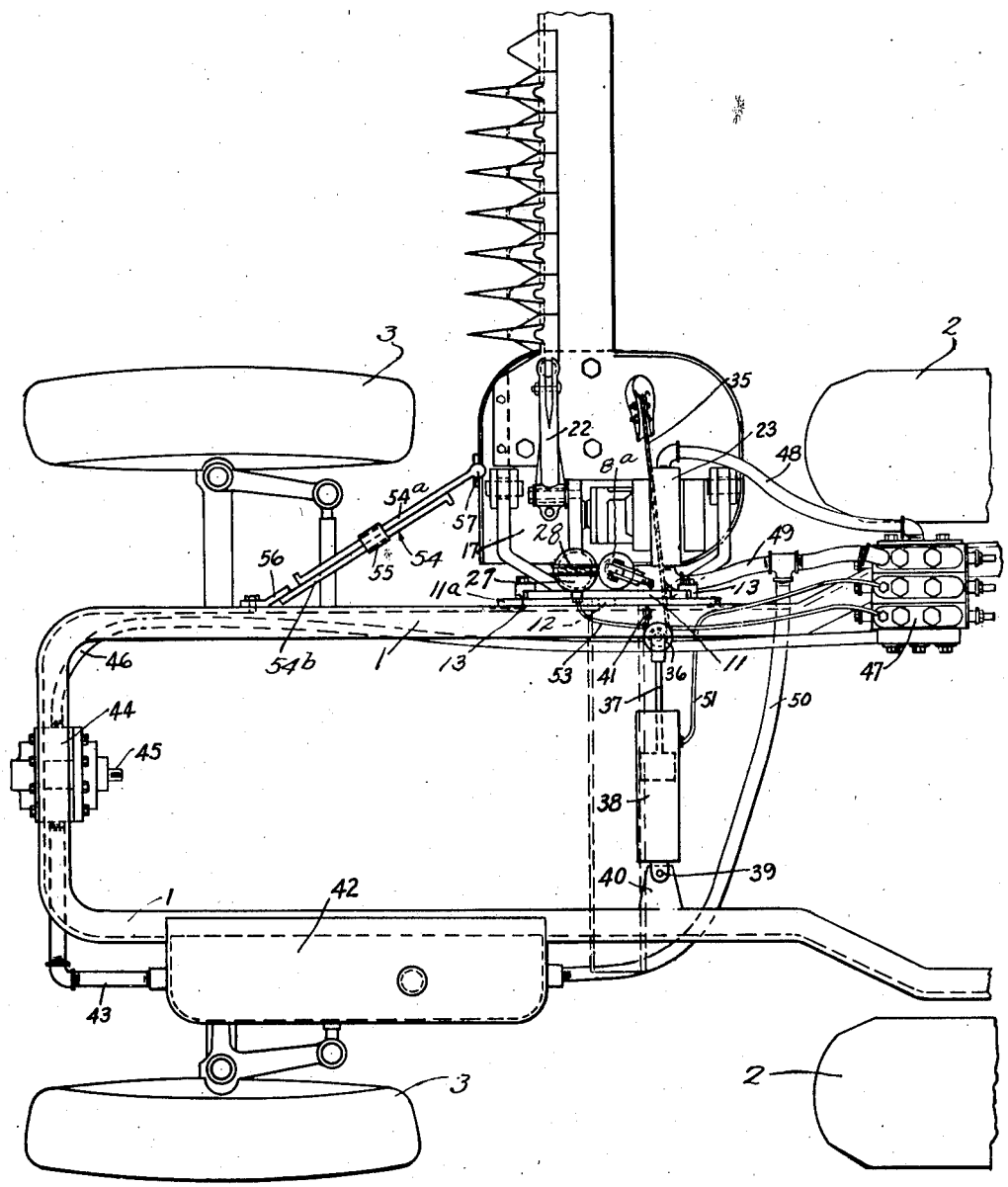
Figure 3 is a fragmentary top plan view showing largely the chassis or frame of a conventional type of tractor equipped with the mower attachment of my invention and illustrating particularly the fluid pressure lines and general mounting of the attachment upon the vehicle chassis, the outermost portion of the cutter bar and associated carried parts being broken away.
Figure 4:
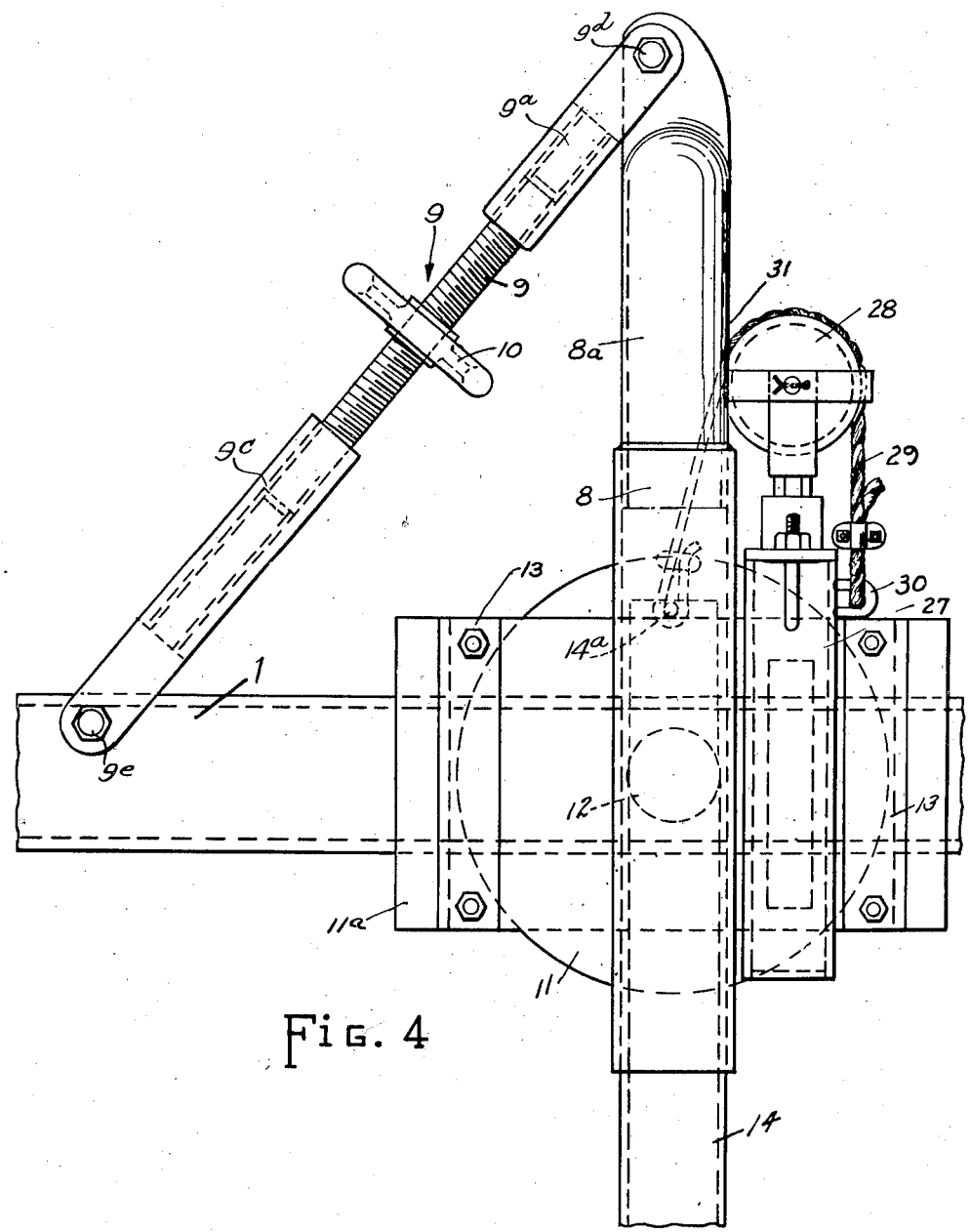
Figure 4 is a side view showing somewhat more fully the turntable mounting of the cutter bar attachment upon a side of the vehicle frame or chassis.

Referring to the drawings and describing my improvements in detail, Figure 3 shows a portion of the tractor vehicle in conjunction with which my mower attachment will be used. This vehicle may be a tractor of a known type in use today, since the specific construction of the tractor is not material to the invention.

As seen in Figure 3, there is illustrated the chassis or frame 1 of the tractor carried by the rear wheels 2 and adapted to be supported at the front end by the front wheels 3, the connections of which with the tractor frame are not completely illustrated since they do not enter into the invention. On the vehicle chassis 1 there will be the usual operator's seat adjacent to which is located the steering column 4, see Figure 1, with its steering wheel 5 partially shown. At the front end of the tractor, see Figure 2, the customary engine or motor 6 will be mounted in rear of the radiator 7, the motor unit being of course employed for driving the tractor in the customary manner of operation.

My mower attachment comprises mainly a vertical tubular standard 8, the upper end of which is somewhat reduced in diameter as at 8a and connected by an adjustable brace 9 with the side of the chassis or frame 1 at which the mower attachment is disposed. The adjustment of the brace 9 is effected by a turning wheel 10 fixed on screw section 9b carried by a turn buckle sleeve 9a of the brace 9, and lower sleeve 9c. Sleeve 9a is attached to standard part 8a at 9d, and sleeve 9c to chassis 1 at 9e. The parts of screw section 9b above and below wheel 10 are oppositely threaded. Adjustment of the wheel 10 is designed to pull the upper end of the standard 8—8a rearwardly or push it forwardly.

To enable the foregoing action to take place the tubular standard 8 is welded, or otherwise attached, to a turntable plate 11, which is circular in form, and at the center of which is carried a trunnion member 12 mounted in a round opening or bearing formed in a supporting plate 11a attached to the side of the vehicle frame 1 at which the mower attachment is disposed. The turntable plate 11 is held in vertical position at the outer side of the supporting plate 11a parallel with the face of the frame at which it is carried, by means of a pair of holding and guide members 13 which consist of angle plates secured to plate 11a and which overlie peripheral edge portions of the turntable plate or member 11 and prevent it from displacement from the frame by maintaining the interengagement of its trunnion member 12 in the opening or bearing in which it is mounted. Obviously, the turning of the adjusting wheel 10 by the operator seated adjacent the steering wheel will rock the upper end of the tubular standard 8 forwardly or backwardly around an axis constituting the trunnion member 12, and in a vertical plane at the outer side of the chassis 1 at which the mower attachment of my invention is disposed.

Supported in the standard 8 and telescoping in its movement within the standard is the hinge bracket post 14 that moves upwardly and downwardly relative to the lower end of the supporting standard 8. The member 14 carries at its lower end the cutter bar hinge bracket 15 which is of somewhat U-form having outwardly and downwardly extending sides provided with pivotal connections 16 attaching their lower ends to the main shoe 17 of the cutter bar unit or mechanism. From the shoe 17 there extends a cutter bar unit which may be of any general known type involving the cutter bar 18 and a suitable cutter blade 19 mounted thereon and including cutting knives that operate through the fingers or rock guards 20. The cutting knife 19 is equipped with the knife head 21 which is pivotally connected to the driving member 22 operated from the fluid motor 23, which, as a unit, is carried by the shoe 17.

The fluid motor 23 may be of any known type within the purview of my invention, and its shaft is connected to operate a driving or pitman wheel 24, the wrist pin of which is connected at 25 with the driving member 22, the latter virtually constituting a connecting rod.

Figure 2:
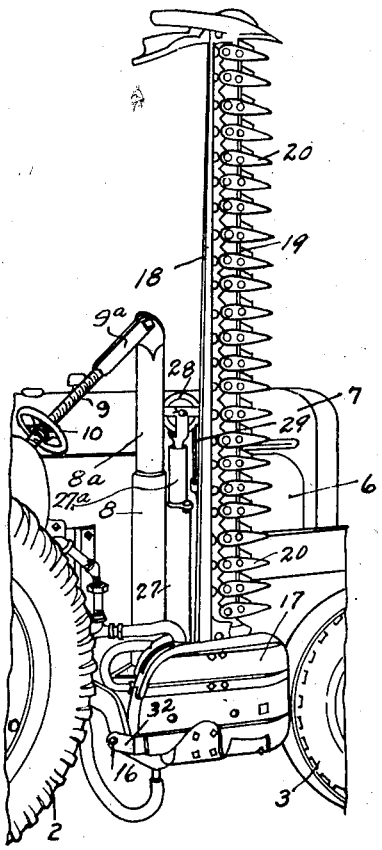
Figure 2 is a view somewhat similar to Figure 1, but illustrating the cutter bar as when elevated to a substantially vertical position, the position assumed thereby when not in use.

The axis provided by the connecting bolts or pivots 16 between the hinge bracket 15 and the cutter bar unit enable the unit to be tilted about the said axis so as to be raised to a vertical position as shown in Figure 2, or adjusted to various angles respecting the horizontal. When the tractor provided with my mower attachment is operating on an elevated base and the mowing operation is to be performed on a bank side downwardly inclined from the base, the cutter bar unit will be adjusted to incline downwardly from the horizontal and from its axis provided by the member 16. On the other hand, if the tractor is disposed at the side of an upwardly rising bank and the mower attachment is to be used for cutting grass or weeds on the said bank, the cutter bar unit will be adjusted about the members 16 by being tilted upwardly to a proper angle so that the unit will be substantially parallel to the ground surface over which the mowing operation is to be performed.

The bodily raising and lowering movement of the cutter bar unit in order to position the cutter bar properly in respect to the surface over which it travels is effected by pressure units now to be described including a fluid pressure unit comprising a cylinder 27 and piston 27a and the cylinder 27 is mounted rigidly in attachment with the standard 8 at the front side of the latter. This unit has the piston thereof, connected to support a sheave or pulley 28 at the upper end of the member 27a, over which sheave the lifting cable 29 operates. Said cable 29 is anchored at its portion external to the pressure unit 27, 27a to a loop 30 on the cylinder 27, and the opposite end of the cable 29 passes through a slot 31 in the portion 8a of the standard 8 and thence extends downwardly through the hollow body of the standard 8 to a point of connection 14a with the upper end of the hinge bracket post 14. Obviously, when pressure is applied to the underside of the piston 27a in the cylinder 27 to push upwardly on the piston and its piston rod, thereby to elevate the pulley 28, the post 14 and the supported end of the cutter bar unit carried thereon by means of the hinge bracket 15 will be correspondingly elevated. The elevation of the supported end of the cutter bar will of course depend upon the amount of raising movement imparted to the post 14.

The means for shifting the cutter bar mechanism to various angular positions extending from the tilting points of pivotal support comprise the axis bolts or members 16 between the shoe brackets 32 and the hinge bracket 15, and will now be described. These angular positions, as previously indicated, may be angles lowering from the horizontal or extending upwardly from the horizontal line of the axes 16.

Connected with a secondary shoe member 33 on the main shoe 17 by a cable bracket 34 is the pull cable 35 which leads from the shoes 33 and 17 around a sheave 36 on the piston rod 37 of a pressure unit 38 extending transversely between the sides of the chassis 1 of the vehicle, see Figure 3, and comprising the usual cylinder, pressure piston within the cylinder, and said piston rod 37. The cylinder of the pressure unit 38 is pivotally mounted at 39 on bracket 40 attached to one side of the chassis of the vehicle. The cable 35 which passes around the pulley 36 is dead ended on the side of the chassis 1 opposite that to which the cylinder 38 is pivoted, the dead end being designated 41.

It will be apparent that when pressure fluid is admitted to the end of the cylinder 38 adjacent to the sheave 36, the piston in the cylinder may be moved toward the opposite end, exerting a pull on the rod 37 and the pulley 36, thereby correspondingly pulling on the cable 35 to enable the cutter bar unit to be positioned at the various angles to which I have referred above, to permit of mowing operations on downwardly or upwardly inclined banks, or more or less level ground.

Obviously, vertical bodily movement of the cutter bar mechanism may be produced by causing simultaneous movement of the sheave 28, and movement of the sheave 36 relatively to the cylinder 38.

Figure 1:
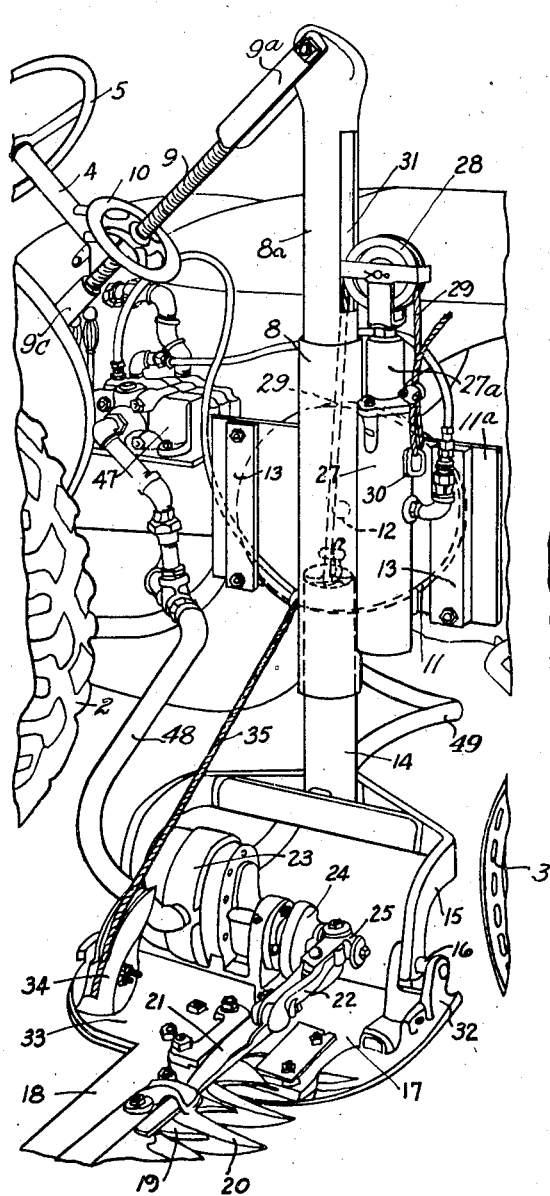
Figure 1 is a fragmentary perspective view of the middle portion of a tractor vehicle, showing a mower attachment mounted thereon in accordance with my invention, the cutter bar being broken away and only illustrated at the inner end portion thereof, and a fragmentary portion of a front wheel being shown at the right extremity of the view.

For the operation of the fluid motor 23 and the pressure units 27 and 38, any suitable source of pressure fluid may be resorted to. I have illustrated in my drawings, especially referring to Figure 3, a pressure fluid tank 42 connected by a conduit 43 with the pump 44, the latter including a driving shaft 45 which may be connected with a suitable power take off from the motor 6, omitted in the illustration of Figure 3. Said pump 44 is further connected by a conduit 46 with a control valve unit 47 that is located within the confines of the machine adjacent to the operator's seat and near the steering wheel 5 in steering column 4 as seen in Figure 1. From the control valve unit 47 a conduit 48 leads to the supply port for the fluid motor 23, and from the exhaust side of the motor 23 a conduit 49 leads back to the control valve unit 47. Also, a branch conduit 50 leads from the conduit 49 to the front end of the fluid pressure tank 42. Leading from another portion of the control valve unit 47 to the adjacent end of the pressure unit 38 is a conduit 51, and leading from still another portion of the control valve 47 to the lower end of the pressure unit 27 is the conduit 53.

In the operation of the pressure unit 38 the pressure fluid is admitted to the pulley end of the unit 38 to apply pressure to the piston in the cylinder of the unit for effecting a pull on the cable 23. This affords the raising action of the cutter bar unit, and by releasing the fluid at the said end of the cylinder of the unit 38, the lowering of the shoe 17 with the supported motor and cutter bar mechanism will be effected. In a similar manner, in respect to the pressure unit 27, the admission of the pressure fluid through the conduit 53 in the lower end of the cylinder of said unit will force the piston in the cylinder of the latter upwardly, raise the sheave or pulley 28, and, by means of the cable 29, raise the post 14 supporting the hanger or hinge bracket 15 and associated cutter bar unit. Release of the pressure fluid from the lower end of the cylinder of the unit 27 will permit lowering of the post 14 and supporting cutter bar unit due to the gravitative force of the weight of the said parts.

As previously indicated, the angularity of the cutter bar and its associated cutting blade or knife in respect to the turning thereof about a horizontal axis parallel with the ground surface on which the tractor moves is controlled by the adjustable brace connection 9 affording a means of operating the standard 8 and rotating the turntable plate 11 about the axis of its trunnion 12 while guided and held in its vertical position at the side of the chassis 1 by means of the members 13.

For stabilizing the mower attachment and particularly the cutter blade unit supporting means, I employ a stabilizing brace seen in Figure 3 at 54 and composed of relatively sliding plate members 54a and 54b connected by a loop 55 attached to one of said members. The brace takes the normal back thrust on the cutter bar and is yieldable by sliding action of its parts to permit the cutter bar unit to swing rearwardly when it strikes a resisting obstacle. One of the plate members of the brace is secured by a pivot plate 56 to the side of the chassis 1 at which the mower attachment is disposed, and the other of said plates is connected by a universal joint 57 with the shoe 17 of the cutter bar unit. As the cutter bar unit is raised and lowered, the brace 54 shortens and lengthens, respectively, while maintaining a certain amount of stabilizing rigidity of connection between the shoe 17 and the side of the chassis independently of the turntable plate 11 and trunnion 12 connection previously described.

Having thus described my invention, what I claim as new and desire to secure by Letters Patent of the United States, is:

1. In a mower attachment for tractors, in combination, attachment means for securing a mower attachment at one side of the chassis of a tractor, said mower attachment comprising a relatively vertical standard, a cutter bar unit supporting post movable in said standard vertically of the latter, a cutter bar unit supported on said post, including a cutter bar and cutting knife, means operatively associated with the post for raising and lowering the post, combined with horizontal trunnion means adapted to pivotally connect said standard with a side of the chassis of a tractor vehicle, and means connecting the standard with the chassis of a tractor vehicle adjustable to shift the standard about the trunnion and change the horizontal angularity of the cutter bar unit.

2. A cutter bar attachment as claimed in claim 1, said last connection means comprising an adjustable brace attached to the standard and connectible to a tractor frame, and a manual device for adjusting the length of said brace.

3. In a mower attachment for tractors, in combination, attachment means for securing a mower attachment at one side of the chassis of a tractor, said mower attachment comprising a relatively vertical standard, horizontal trunnion means to be carried by a tractor and coacting to pivotally support said standard for tilting movement forwardly or rearwardly of the tractor on the chassis of the tractor, a supporting post vertically movable in the standard, a cutter bar unit carried by said post and including a cutter bar and cutting knife, means connected to the chassis to hold the standard in vertical or tilted positions while carried by said trunnion comprising an adjustable connector between the top of the standard and the frame, and means operatively associated with the post to move the post upward or downward relatively to the standard.

4. An attachment as claimed in claim 3, combined with a turntable plate fixed to the standard with the trunnion forming an axis for said plate, and guide members engaging the outer face of said plate and attachable to a side of a tractor chassis.

5. An attachment as claimed in claim 3, combined with a turntable plate fixed to the standard with the trunnion forming an axis for said plate, and guide members engaging the outer face of said plate and attachable to a side of a tractor chassis, and consisting of angle plates vertically disposable in relation to the tractor chassis and having flanges engageable with opposite portions of the turntable plate at the outer side of the latter during rotation of the said plate.

6. An attachment as calimed in claim 3, in which the holding means for the standard also comprises an adjustable forwardly extending yielding connecting brace, one end of which is attached to the front portion of the mower attachment at its lower front end and the other end of which has equipment for connection with a tractor frame.

WALTER K. LEICY.

REFERENCES CITED

The following references are of record in the file of this patent:

UNITED STATES PATENTS

| Number | Name | Date |
| --- | --- | --- |
| 1,958,405 | Anthony et al. | May 15, 1934 |
| 2,259,889 | Hilblom | Oct. 21, 1941 |
| 2,292,962 | Mott | Aug. 11, 1942 |
| 2,310,387 | Blair et al. | Feb. 9, 1943 |
| 2,311,117 | MacDonald et al. | Feb. 16, 1943 |
| 2,324,563 | Gustenborder | July 20, 1943 |
| 2,328,838 | Oberlink | Sept. 7, 1943 |
| 2,375,912 | Gifford et al. | May 15, 1945 |